United States Patent [19]

Garst et al.

[11] 3,996,998
[45] Dec. 14, 1976

[54] COMBINATION FURNACE—HEAT PUMP UNIT

[75] Inventors: Michael G. Garst; Donald D. Towe; Philip L. Zink; Theodore P. Gilles, all of Marshalltown, Iowa

[73] Assignee: Lennox Industries Inc., Marshalltown, Iowa

[22] Filed: Nov. 27, 1974

[21] Appl. No.: 523,419

[52] U.S. Cl. .................................. 165/12; 165/27; 165/29
[51] Int. Cl.² ..................... F25B 29/00; F28F 27/00
[58] Field of Search ........................ 165/29

[56] References Cited
UNITED STATES PATENTS

| | | | |
|---|---|---|---|
| 2,806,674 | 9/1957 | Biehn | 165/29 |
| 2,902,220 | 9/1959 | Myck, Jr. et al. | 165/29 X |
| 3,173,476 | 3/1965 | McCready | 165/29 X |
| 3,283,809 | 11/1966 | Eberhart | 165/29 |
| 3,318,372 | 5/1967 | Shell | 165/29 |
| 3,404,729 | 10/1968 | Arnott et al. | 165/29 |
| 3,444,923 | 5/1969 | Kyle et al. | 165/29 |
| 3,537,509 | 11/1970 | Ferdelman | 165/29 |
| 3,556,203 | 1/1971 | Kyle | 165/29 |

*Primary Examiner*—Albert W. Davis, Jr.
*Assistant Examiner*—Sheldon Richter
*Attorney, Agent, or Firm*—Allegretti, Newitt, Witcoff & McAndrews

[57] ABSTRACT

A heating system for conditioning the air in an enclosure. The heating system includes a furnace, heat pump and control mechanism for coordinating operation thereof.

13 Claims, 2 Drawing Figures

COMBINATION FURNACE—HEAT PUMP UNIT

BACKGROUND OF THE INVENTION

The energy crisis presently being endured emphasizes the need for conserving natural resources through more efficient use. One area of investigation is the heating of homes, office buildings, factories, etc. It is well known that heating fuel requirements represent a major percentage of all fuel production.

Efforts are, therefore, continually being made to develop new heating systems and improve presently known systems. It is recognized that even the slightest "per home" fuel savings will, nationwide, significantly lessen the fuel consumption burden.

SUMMARY OF THE INVENTION

In a principal aspect, the present invention is a system for conditioning the air in an enclosure combining a furnace and heat pump. The operation of the furnace and neat pump are coordinated by a control mechanism which includes or is responsive to a thermostat for sensing the temperature of the air in the enclosure, i.e., the indoor temperature. The thermostat has a first and second predetermined threshold temperature setting, which define first and second stages of heating.

As the indoor temperature drops below the first threshold setting, the control mechanism, in response to the thermostat, activates the heat pump. This first state operation of the control mechanism continues until the enclosure temperature substantially equals or slightly exceeds the first threshold temperature or drops below the second threshold temperature, inducing second state operation.

In the second state, the furnace is activated by the control mechanism to heat the supply air delivered to the enclosure. The heat pump is deactivated during this mode of operation.

The control mechanism also delays energization of the heat pump as the heating system switches from the second to the first state. Thus, as the indoor temperature rises above the second threshold temperature, the heat pump remains inactive for a period of time to substantially avoid high discharge pressures in the heat pump compressor due to the relatively hot supply air exiting the furnace after second state operation.

It is thus an object of the present invention to provide an improved, more efficient system for conditioning the air in an enclosure.

It is a further object of the present invention to provide a heating system effectively combining a furnace and heat pump.

It is another object of the present invention to provide an improved control mechanism for a combination furnace-heat pump system.

It is also an object of the present invention to provide a hybrid or combination heating system which results in a substantial fuel savings, as compared with conventional heating systems.

It is still another object of the present invention to provide a heating system combining a furnace and heat pump wherein the heat pump alone is activated in a first state, or low demand state, and the furnace alone is activated in a second state, or high demand state.

It is a further object of the present invention to provide a combination furnace-heat pump air conditioning system wherein the heat pump reversably functions to heat and cool supply air delivered to the enclosure.

It is yet another object of the present invention to provide an improved heating system which is readily and inexpensively manufactured.

These and other objects, features and advantages of the present invention will become apparent in the following detailed description.

BRIEF DESCRIPTION OF THE DRAWINGS

A preferred embodiment of the present invention will be described in detail with reference to the drawing wherein.

DETAILED DESCRIPTION OF THE PREFERRED EMBODIMENT

Apparatus

Figure 1:
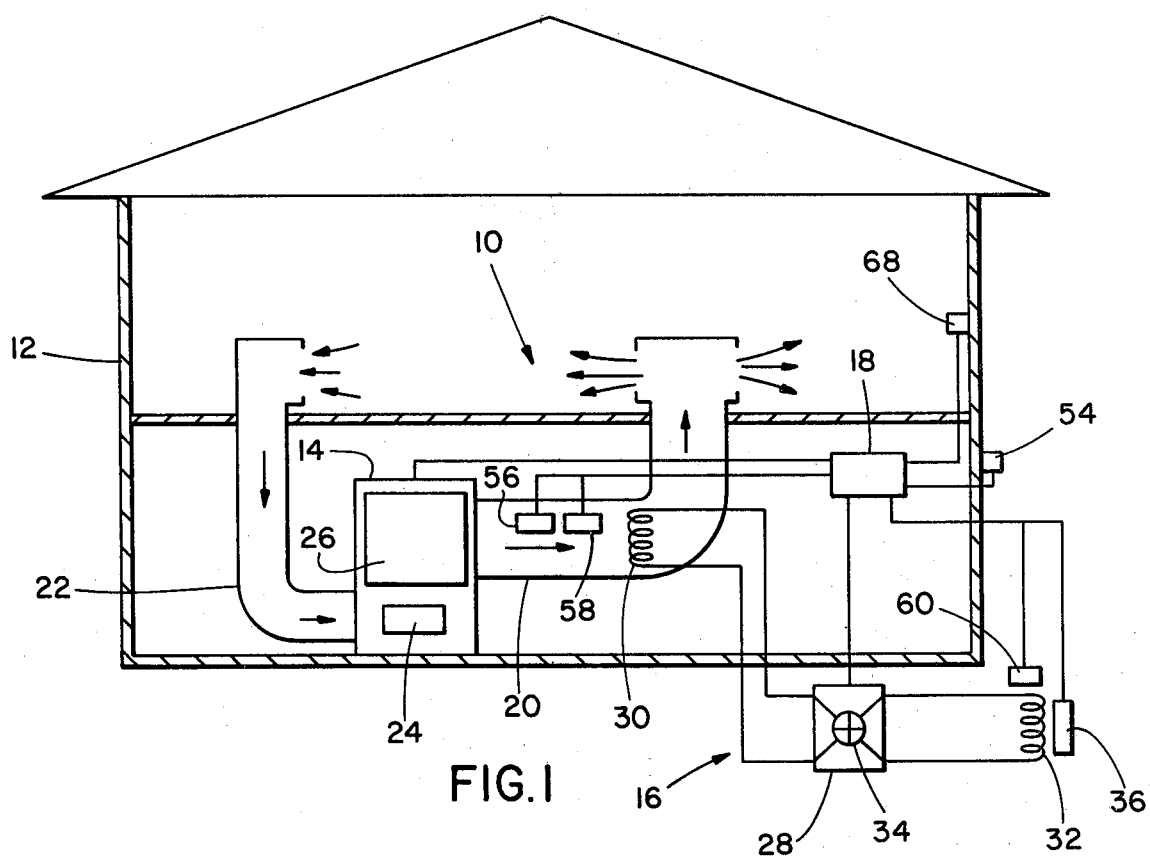
FIG. 1 is a plan view of a home or enclosure schematically illustrating a preferred embodiment of the present invention.
Figure 2:
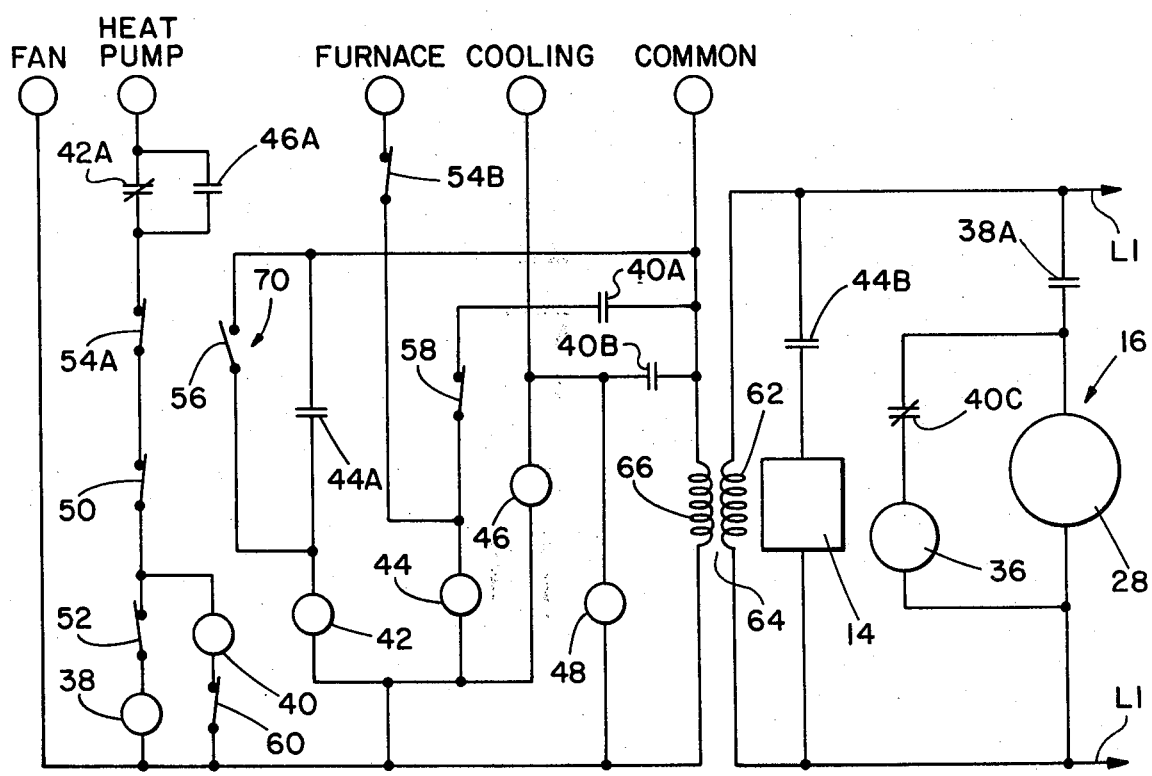
FIG. 2 is a schematic diagram of a control mechanism for use in the preferred embodiment shown in FIG. 1.

A preferred embodiment of the present invention is shown in FIGS. 1 and 2 as a system, generally designated 10, for conditioning the air in an enclosure 12. The system 10 includes both heating and cooling capabilities. The air in the enclosure 12 has an indoor temperature, as compared to the ambient or outdoor temperature.

The system 10 includes a furnace 14, heat pump 16 and control mechanism 18 for coordinating operation of the furnace 14 and heat pump 16. As shown, the heat pump 16 is preferably located outside of the enclosure 12. The furnace 14, a propane, oil or electric furnace, delivers conditioned supply air to the enclosure 12 through supply ducts, generally designated 20. Enclosure air is drawn to the furnace 14 for reconditioning thrugh return ducts 22. The furnace 14 includes a blower and heat exchanger, shown schematically as 24 and 26, respectively.

The heat pump 16 includes a compressor 28, inside coil 30 and outside coil 32. As shown, the inside coil 30 communicates directly with the supply air delivered to the enclosure 12.

The heat pump 16 also includes a reverse valve 34 and a fan 36 for circulating air around and through the outside coil 32. The reverse valve 34 permits operation of the heat pump 16 in both a heating and cooling mode.

In the heating mode, the outside coil 32 operates as an evaporator absorbing heat and the inside coil 30 operates as a condenser dispensing heat to the supply air moved by the blower 24. The operation of the coils 30, 32 are reverse in the cooling mode.

As shown in FIG. 2, the heat pump 16 and more particularly the inside coil 30 are downstream of the furnace 14. This arrangement or orientation substantially avoids condensation of moisture and corrosion in the heat exchange 26 during operation of the heat pump 16 in the cooling mode. That is, with downstream placement of the heat pump 16, air cooled by the heat pump 16 does not pass directly through the furnace 14 and heat exchanger 26.

As shown schematically in FIG. 2, the control mechanism 18 includes a compressor relay 38, having normally open contacts 38A, a defrost relay 40, having normally open contacts 40A, 40B and normally closed contacts 40C, a heat pump cutoff relay 42, having normally closed contacts 42A, a furnace relay 44, having normally open contacts 44A, 44B, a relief relay 46, having normally open contacts 46A, and a reverse valve relay 48. Further, the control mechanism includes a high pressure sensitive switch 50, a low pressure sensitive switch 52, temperature sensitive, or responsive, switches 54, 56, 58, and temperature differential switch 60 (described in further detail below).

Again, referring to FIG. 2, the furnace 14 and heat pump 16 are activated, i.e., electrically powered by a power line L1. The line L1 is also connected to the primary winding 62 of a transformer 64. The secondary winding 66 of the transformer 64 acts as a power supply for the control mechanism 18 to actuate the relays 38, 40, 42, 44, 46, 48, as described below. The elements 14–66 are electrically connected as shown.

The reverse valve relay, upon actuation, i.e., interconnection with the secondary winding 66, energizes the reverse valve 34. The reverse valve 34 is normally in the heating mode, and, upon energization, switches to the cooling mode.

As shown in FIG. 1, the system 10 also includes a thermostat 68 for sensing the indoor temperature of the enclosure 12. The control mechanism 18 is connected and responsive to the thermostat 12.

More particularly, the terminals "Heat Pump", "Furnance" and "Cooling" of the control mechanism 18, as shown in FIG. 2, are selectively connected to the terminal "Common", and thus the secondary winding 66, by and through the thermostat 68, as determined by room conditions. The thermostat 68 is a two-stage heating, two-stage cooling thermostat. Selection of the heating and cooling mode is a manual operation effected by a switch (not shown) on the thermostat 68, as well known in the art.

In the heating mode, the thermostat 68 has a first and second predetermined threshold temperature setting. The first and second threshold temperature are preferably 72°, 68° F., respectively. In the cooling mode, the thermostat 68 has a predetermined cooling threshold.

As shown in FIG. 1, the temperature sensitive switches 56 and 58 communicate directly with the supply air delivered to the enclosure 12. The thermoswitch 56 has a predetermined closing temperature, preferably 110° to 120° F. That is, the thermo-switch 56 closes whenever the supply air temperature exceeds the predetermined closing temperature. Ideally, the thermo-switch 56 would also open as the supply air temperature drops below the predetermined closing temperature, e.g., 110° F. However, in practice, a somewhat lower temperature, e.g., 90° F., must be achieved prior to actual switching. Thermo-switch 56 may be a fan control.

Conversely, the thermo-switch 58 is normally closed and has a predetermined opening temperature. In this preferred embodiment, the preferred opening temperature of thermo-switch 58 is 105° to 120° F. A limit control may be used as thermo-switch 58.

The temperature sensitive switch 54, having a pair of contacts 54A, 54B, communicates directly with the outdoor air and responds to the ambient temperature. At a predetermined, relatively low temperature, the normally closed contacts 54A open, while at a predetermined relatively high temperature, the normally closed contacts 54B open. Preferably, the relatively high and low temperatures are in the range of 30° to 50° F. and −10° to 10° F., respectively.

The temperature differential switch 60 senses a temperature difference between the outdoor air and the outside coil 32 and closes whenever the difference exceeds a predetermined temperature differential. This predetermined differential is preferably 25° to 40° F.

The pressure sensitive switches 50, 52 are responsive to the discharge pressures in the heat pump 16. The pressure switches 50, 52 are safety devices which deactivate the heat pump 16 whenever unsafe operating conditions develop.

Operation

A. Heating Mode

As discussed, the thermostat 68 senses the temperature of the air within the enclosure 12. A temperature above the first threshold temperature of the thermostat 68 indicates a satisfied heating condition, and thus, the furnace 14 and heat pump 16 are inactive.

As the indoor temperature drops below the first threshold temperature setting, e.g., 72° F., the control mechanism 18, in response to the thermostat 68, begins first state operation or heating. That is, the thermostat 68 interconnects the Heat Pump and Common terminals, thereby actuating the compressor relay 38. Contacts 38A and closed and the compressor 28 and fan 36 are energized by power line L1.

The heat pump 16 alone conditions and heats the supply air during first state operation, and this heating continues until the indoor temperature equals, or slightly exceeds, the first threshold temperature of the thermostat 68, or until the heat load on the enclosure 12 causes the indoor temperature to drop below the second threshold temperature setting. In the latter situation, second state heating begins by interconnection of the Furnace and Common terminals through the thermostat 68. That is, when the heat pump 16 cannot satisfy the thermostat 68, the thermostat 68 activates the furnace 14 for additional heating capacity.

Interconnection of the Furnace and Common terminals actuates the furnace relay 44 closing contacts 44A, 44B. The closing of contacts 44B energizes the furnace 14 by connection to the power line L1. The blower 24 is energized in both first and second stage heating to force the flow of return and supply air.

The contacts 44A, upon closing, connect the heat pump cutoff relay 42 directly across the secondary winding 66 of the transformer 64, thereby opening contacts 42A. As a result, the compressor relay 38 is de-actuated and the compressor 28 and heat pump 16 are de-energized. It should be noted that the Heat Pump terminal remains connected to the Common terminal through the thermostat 68 during second state operation. As long as the first threshold temperature exceeds the indoor temperature, the thermostat 68 "calls for" heat from the heat pump 16.

The furnace 14 remains activated until the indoor temperature again exceeds the second threshold temperature, whereupon the furnace relay 44 is de-actuated, i.e., the thermostat 68 disconnects the furnace relay 44 from the secondary winding 66. As the transfer from second to first state heating occurs, the heat pump 16 remains de-energized for a period of time. That is, the heat pump cutoff relay 42 remains actuated through the thermo-switch 56.

The thermo-switch 56, communicating directly with the heated supply air from the furnace 16, closes when the supply air temperature exceeds the predetermined closing temperature, e.g., 115° F. As a result, the heat pump cutoff relay 42 remains actuated until the heat exchanger 26 and supply air sufficiently cool, causing the thermo-switch 56 to open. Thus, the thermo-switch 56 provides means, generally designated 70, for delaying the energization of the heat pump 16 as the system 10 switches from second to first state heating.

The delay means 70 substatially avoids high refrigerant pressures caused by passage of hot supply air over an operational inside coil 30. Such pressure would trigger the high pressure safety switch 50, thereby deactivating the heat pump 16.

During first state heating, frost develops on the outside coil 32 of the heat pump 16 whenever the difference in temperature between the outside air and outside coil 32 becomes substantial. The actual difference necessary depends upon weather conditions. However, a temperature differential of approximately 25-40° F. is usually sufficient.

This temperature difference is sensed, or measured, by the temperature differential switch 60 which closes whenever the predetermined temperature differential is exceeded. Closing initiates the defrost cycle, i.e., the third state of operation of the control mechanism 18.

The temperature differential switch 60 actuates the defrost relay 40, closing contacts 40A, 40B and opening contacts 40C. In response, the furnace relay 44, heat pump cutoff relay 42, reverse valve relay 48 and relief relay 46 are actuated.

Actuation of the relief relay 46 effectively overrides the heat pump cutoff relay 42. Referring to FIG. 2, contacts 42A, 46A simultaneously open and close, respectively, such that the compressor relay 38 remains actuated. Thus, the operation of the heat pump 16 is reversed and the outside coil 32, operating as a condenser, if defrosted.

The furnace 14 is energized in the defrost mode to provide sufficient heat for absorption by the inside coil 30 of the heat pump 16, functioning as an evaporator, and to substantially avoid circulation of cool supply air to the enclosure 12 when heating is needed. The furnace 14 operates until the temperature responsive switch 58 opens, deactivating the furnace relay 44. As indicated, the thermo-switch 58 opens whenever the supply air temperature exceeds the predetermined opening temperature. With an opening temperature of 105° – 120° F., the furnace cycles are sufficiently long for safe furnace operation. In most instances, the defrost cycle is approximately 5 to 6 minutes in length.

The furnace 14 and heat pump 16 operate simultaneously, as discussed above, so long as the ambient temperature is within the range of thermo-switch 54, such that contacts 54A, 54B are closed. Whenever the ambient outdoor temperature exceeds the predetermined, relatively high temperature, the furnace 14 is completely "cut-off" by the opening of contacts 54B. Similarly, should the ambient temperature drop below the predetermined, relatively low temperature setting of the thermo-switch 54, the heat pump 16 is cut-off. This cut-off feature substantially increases the effectiveness and efficiency of the system 10.

Energy consumption calculations establish that the system 10, in the heating mode, will result in substantial fuel savings. Two locations were theoretically studied — Des Moines, Iowa (cool climate) and Wilmington, Delaware (mild climate) — on the basis of average temperatures. The figures for a fossil fuel furnace having a 75 percent efficiency rating are shown in Tables I and II and summarized in Table III.

TABLE I

Energy Consumption - Des Moines, Iowa

| TEMPERATURE | HOURS PER YEAR | LOAD PER HOUR | HEAT PUMP CAPACITY | HOURS RUN | K.W. PER HOUR | K.W. TOTAL | FURNACE BTU REQUIRED | FURNACE BTU REQUIREMENT WITH NO HEAT PUMP |
|---|---|---|---|---|---|---|---|---|
| −10 to −14 | 12 | 82,500 | 0 | 0 | 0 | 0 | 990,000 | 990,000 |
| −5 to −9 | 27 | 77,200 | 0 | 0 | 0 | 0 | 2,084,400 | 2,084,400 |
| 0 to −4 | 63 | 71,900 | 0 | 0 | 0 | 0 | 4,529,700 | 4,529,700 |
| 0 to 4 | 108 | 66,600 | 15,000 | 13 | 2.75 | 36 | 6,997,800 | 7,192,800 |
| 5 to 9 | 155 | 61,300 | 16,500 | 28.5 | 2.80 | 80 | 9,031,250 | 9,501,500 |
| 10 to 14 | 222 | 56,000 | 18,500 | 63.5 | 2.85 | 181 | 11,257,250 | 12,432,000 |
| 15 to 19 | 269 | 50,600 | 21,000 | 104.4 | 2.95 | 308 | 11,419,000 | 13,611,400 |
| 20 to 24 | 401 | 45,300 | 23,000 | 196.5 | 3.05 | 599 | 13,645,800 | 18,165,300 |
| 25 to 29 | 524 | 40,000 | 25,000 | 314.4 | 3.15 | 990 | 13,100,000 | 20,960,000 |
| 30 to 34 | 743 | 34,600 | 28,500 | 553.5 | 3.30 | 1827 | 10,933,050 | 26,707,800 |
| 35 to 39 | 618 | 29,200 | 31,500 | 572.9 | 3.45 | 1977 | 0 | 18,045,600 |
| 40 to 44 | 517 | 23,800 | 35,000 | 351.6 | 3.65 | 1283 | 0 | 12,304,600 |
| 45 to 49 | 505 | 18,400 | 38,500 | 241.4 | 3.85 | 929 | 0 | 9,292,000 |
| 50 to 54 | 543 | 13,100 | 42,000 | 169.4 | 4.20 | 711 | 0 | 7,113,300 |
| 55 to 59 | 594 | 7,800 | 46,000 | 100.7 | 4.45 | 448 | 0 | 4,633,200 |
| 60 to 64 | 678 | 2,500 | 50,000 | 33.9 | 4.70 | 159 | 0 | 1,695,000 |
|  |  |  |  |  |  | 9528 | 83,988,250 | 169,258,600 |

TABLE II

Energy Consumption - Wilmington, Delaware

| TEMPERATURE | HOURS PER YEAR | LOAD PER HOUR | HEAT PUMP CAPACITY | HOURS RUN | K.W. PER HOUR | K.W. TOTAL | FURNACE BTU REQUIRED | FURNACE BTU REQUIREMENT WITH NO HEAT PUMP |
|---|---|---|---|---|---|---|---|---|
| −10 to −14 | 0 | 0 | 0 | 0 | 0 | 0 | 0 | 0 |
| −5 to −9 | 0 | 0 | 0 | 0 | 0 | 0 | 0 | 0 |
| 0 to −4 | 0 | 0 | 0 | 0 | 0 | 0 | 0 | 0 |
| 0 to 4 | 6 | 81,700 | 15,000 | 0 | 2.75 | 0 | 490,200 | 490,200 |
| 5 to 9 | 17 | 75,200 | 16,500 | 1.5 | 2.80 | 4 | 1,255,968 | 1,278,400 |
| 10 to 14 | 50 | 68,700 | 18,500 | 7.3 | 2.85 | 21 | 3,299,950 | 3,435,000 |
| 15 to 19 | 124 | 62,100 | 21,000 | 32 | 2.95 | 94 | 7,028,400 | 7,700,400 |
| 20 to 24 | 222 | 55,500 | 23,000 | 83.4 | 3.05 | 254 | 10,402,800 | 12,321,000 |
| 25 to 29 | 385 | 49,000 | 25,000 | 192.5 | 3.15 | 606 | 14,052,500 | 18,865,000 |
| 30 to 34 | 696 | 42,500 | 28,500 | 453.9 | 3.30 | 1498 | 14,078,850 | 29,580,000 |
| 35 to 39 | 808 | 36,000 | 31,500 | 671.8 | 3.45 | 2318 | 7,926,300 | 29,088,000 |
| 40 to 44 | 727 | 29,400 | 35,000 | 610.7 | 3.65 | 2229 | 0 | 21,373,800 |
| 45 to 49 | 684 | 22,900 | 38,500 | 406.8 | 3.85 | 1566 | 0 | 15,663,600 |

TABLE II-continued

| | | | Energy Consumption - Wilmington, Delaware | | | | FURNACE | FURNACE BTU |
| TEMPERATURE | HOURS PER YEAR | LOAD PER HOUR | HEAT PUMP CAPACITY | HOURS RUN | K.W. PER HOUR | K.W. TOTAL | BTU REQUIRED | REQUIREMENT WITH NO HEAT PUMP |
| --- | --- | --- | --- | --- | --- | --- | --- | --- |
| 50 to 54 | 653 | 16,300 | 42,000 | 253.4 | 4.20 | 1064 | 0 | 10,643,900 |
| 55 to 59 | 684 | 9,800 | 46,000 | 145.7 | 4.45 | 648 | 0 | 6,703,200 |
| 60 to 64 | 276 | 3,300 | 50,000 | 18.2 | 4.70 | 86 | 0 | 910,800 |
| | | | | | | 10,388 | 58,534,968 | 158,053,300 |

TABLE III

| | BTU Input For Furnace Alone | BTU Input For Furnace and Heat Pump (10,000 BTU) |
| --- | --- | --- |
| DES MOINES, IOWA | 225,678,133 | 207,264,333 |
| WILMINGTON, DELAWARE | 210,737,733 | 181,926,624 |

As shown, regardless of climate, the system 10 requires substantially less fuel than a furnace, operating alone. Calculations indicate savings in the range of 10 – 20%. Monetary savings dependent upon the costs of electricity and fuel.

B. Cooling Mode

In the cooling mode, the Heat Pump and Cooling terminals are connected to the Common terminal by the thermostat 68 whenever the indoor temperature exceeds the predetermined threshold cooling temperature. As such, the compressor 28 and reverse valve 34 are energized and the inside coil 30 cools the supply air moved by the blower 24. Applicants have discovered that presently known cooling, or air conditioning, coils can be used as heating coils with satisfactory performance.

Although a single preferred embodiment of the present invention has been described herein, it should be appreciated that modifications can be made without departure from the true spirit and scope of the present invention, as defined in the following claims.

What is claimed is:

1. A system for conditioning the air in the enclosure, said air having an indoor temperature, comprising in combination:
    furnace means for delivering supply air to said enclosure, said supply air having a supply air temperature;
    heat pump means for conditioning said supply air, said heat pump means including an inside coil, an outside coil and compressor means, said inside coil communicating directly with said supply air downstream from said furnace means;
    thermostatic means for sensing said indoor temperature, said thermostatic means having a first and second predetermined threshold temperature setting; and
    control means for coordinately controlling said furnace means and said heat pump means, said control means being responsive to said thermostatic means, said control means being operable in a first state wheneveer said first predetermined threshold temperature setting exceeds said indoor temperature and at least a second state whenever said second predetermined threshold temperature setting exceeds said indoor temperature, said control means activating said heat pump means alone in said first state, whereby said inside coil heats said supply air, and activating said furnace means alone in said second state, said control means including delay means for delaying activation of said heat pump means as said control means switches from said second state to said first state, said delay means substantially avoiding excessive pressure in said inside coil.

2. A system as claimed in claim 1 wherein said control means includes a power supply.

3. A system as claimed in claim 2 wherein said control means includes compressor relay means for energizing said heat pump means and said compressor means in said first state, said thermostatic means interconnecting said compressor rely means and said power supply in said first state to actuate said compressor relay means.

4. A system as claimed in claim 3 wherein said control means further includes relay means for energizing said furnace and de-energizing said heat pump means in said second state, said thermostatic means interconnecting said relay means and said power supply in said second state to actuate said relay means.

5. A system as claimed in claim 4 wherein said relay means includes furnace relay means and heat pump cutoff relay means, said furnace relay means being actuated by said power supply through said thermostatic means in said second state, said actuated furnace relay means energizing said furnace means and interconnecting said heat pump cutoff relay means and said power supply to actuate said heat pump cutoff relay means, said actuated heat pump cut off relay means de-energizing said heat pump means.

6. A system as claimed in claim 5 wherein said delay means includes temperature sensitive switch means, having a predetermined activation temperature, for interconnecting said heat pump cutoff relay means and said power supply whenever said control means switches from said second state to said first state and said supply air temperature exceeds said predetermined activation temperature, said temperature sensitive switch means communicating directly with said supply air.

7. A system as claimed in claim 2 wherein said control means is operable in a third state to defrost said outside coil.

8. A system as claimed in claim 7 wherein said heat pump means includes reverse valve means for reversing the operation of said heat pump means, said reverse valve means being operable in a normal state wherein said inside coil heats said supply air and an energized state wherein said inside coil cools said supply air.

9. A system as claimed in claim 8 wherein said control means includes defrost relay means and temperature differential switch means, having a predetermined temperature differential, for sensing a temperature difference between said outside coil and the outdoor air, said temperature differential switch means interconnecting said defrost relay means and said power supply whenever said temperature difference exceeds said predetermined temperature differential to actuate said defrost relay means, said actuated defrost relay means energizing said reverse valve means into said energized state, whereby said outside coil is defrosted.

10. In a heating system for conditioning an enclosure of the type having a furnace and heat pump, the air in said enclosure having an indoor temperature, said furnace and heat pump delivering supply air to said enclosure, said supply air having a supply air temperature, said heat pump being downstream of said furnace and including a reverse valve whereby said heat pump is operable in a heating and cooling mode, an improved means for coordinately controlling said furnace and said heat pump comprising, in combination:

a power supply;

compressor relay means operable in a first actuated state for energizing said heat pump, said compressor relay means being interconnected with said power supply in said actuated state;

furnace relay means operable in a second actuated state for energizing said furnace and de-energizing said heat pump, said furnace relay means being interconnected with said power supply in said second actuated state;

thermostatic means for sensing said indoor temperature, said thermostatic means having a first and second predetermined threshold temperature setting, said first threshold temperature setting being higher than said second threshold themperature setting, said thermostatic means interconnecting said compressor relay means and said power supply whenever said indoor air temperature drops below said first threshold temperature setting and interconnecting said furnace relay means in said power supply whenever said indoor temperature drops below said second threshold temperature;

delay means for delaying energization of said heat pump as said indoor temperature rises above said second threshold temperature setting, said delay means including temperature sensing switch means, having a predetermined activiation temperature, for sensing said supply air temperature; and reverse relay means operable in a third actuated state for energizing said reverse valve to transfer said heat pump from said heating mode to said cooling mode.

11. An improved control means as claimed in claim 10 wherein said furnace relay means includes a furnace rely and a heat pump cutoff relay, said furnace relay being interconnected through said thermostatic means to said power supply in said second actuated state, said actuated furnace relay means interconnecting said heat pump cutoff relay means and said power supply in said second actuated state to de-energize said heat pump.

12. An improved control means as claimed in claim 11 wherein said temperature sensitive switch means interconnects said heat pump cutoff relay means in said power supply whenever said supply air temperature exceeds said predetermined activation temperature.

13. An improved control means as claimed in claim 10 further comprising temperature differential switch means, having a predetermined temperature differential setting, for sensing a temperature difference between said outside coil and the outdoor air, said temperature differential switch means interconnecting said reverse relay means and said power supply to actuate said reverse relay means whenever said temperature difference exceeds said predetermined differential threshold, whereby said outside coil is defrosted in said third actuated state.

* * * * *